US009221246B2

(12) United States Patent
Cruikshank et al.

(10) Patent No.: US 9,221,246 B2
(45) Date of Patent: Dec. 29, 2015

(54) METHOD FOR PRINTING AN IMAGE ONTO A THERMOPLASTIC SUBSTRATE, PRE-FORMING PLATE USED THEREFOR AND SECURITY INSTRUMENT MADE THEREFROM

(75) Inventors: David N. C. Cruikshank, Carleton Place (CA); Larry O'Gorman, Ottawa (CA); Sean Connelly, Ottawa (CA)

(73) Assignee: CANADIAN BANK NOTE COMPANY, LIMITED, Ottawa (CA)

( * ) Notice: Subject to any disclaimer, the term of this patent is extended or adjusted under 35 U.S.C. 154(b) by 955 days.

(21) Appl. No.: 13/381,666

(22) PCT Filed: Dec. 28, 2011

(86) PCT No.: PCT/CA2011/050812

§ 371 (c)(1), (2), (4) Date: Jan. 4, 2012

(87) PCT Pub. No.: WO2013/097028

PCT Pub. Date: Jul. 4, 2013

(65) Prior Publication Data

US 2013/0171423 A1 Jul. 4, 2013

(51) Int. Cl.
*B32B 3/00* (2006.01)
*B41M 5/00* (2006.01)
(Continued)

(52) U.S. Cl.
CPC ................ *B41J 2/015* (2013.01); *B42D 15/00* (2013.01); *Y10T 428/24612* (2015.01)

(58) Field of Classification Search
CPC ........... B32B 3/00; B32B 3/30; B32B 38/14; B32B 38/145; B32B 38/06; B41M 1/26; B41M 1/30; B41M 3/14; B41M 5/0047; B41M 5/0088; B42D 25/29; B42D 25/324; B42D 25/425; B42D 25/43; B42D 25/435; B42D 25/44; B42D 25/445; B42D 2033/00; B42D 2033/24; B42D 2033/30; B42D 2035/36
USPC ............. 428/156, 167, 172, 195.1, 915, 916; 283/107, 901, 904; 430/9, 10, 14; 359/2
See application file for complete search history.

(56) References Cited

U.S. PATENT DOCUMENTS

| | | | |
|---|---|---|---|
| 4,250,217 | A | 2/1981 | Greenaway |
| 4,773,677 | A | 9/1988 | Plasse |

(Continued)

FOREIGN PATENT DOCUMENTS

| | | |
|---|---|---|
| EP | 2056583 | 5/2009 |
| JP | 1156093 | 6/1989 |

(Continued)

OTHER PUBLICATIONS

Office Action dated Dec. 3, 2014 issued in connection with U.S. Appl. No. 14/484,259.

(Continued)

*Primary Examiner* — Catherine A Simone
(74) *Attorney, Agent, or Firm* — Oppedahl Patent Law Firm

(57) ABSTRACT

A method is provided by the invention for printing surface applied images to a thermoplastic substrate to provide improved durability to the printed image. A thermoplastic substrate comprises in a predetermined area a pattern, preferably a cell pattern, of recessed image receiving surfaces below a nominal surface of the thermoplastic substrate and a pattern of bridges separating the recessed image receiving surfaces, the depths of the recessed image receiving surfaces and the areas of the bridges separating the recessed image receiving surfaces, relative to the areas of the recessed image receiving surfaces, chosen to provide durability to the image after the image has been printed onto the predetermined area. The image may be printed by ink jet printing. To additionally provide security features to the security instrument, latent and hidden images may be formed by latent image recesses and hidden image recesses, respectively, below the nominal surface.

7 Claims, 3 Drawing Sheets

(51) Int. Cl.

| | |
|---|---|
| ***B41J 2/015*** | (2006.01) |
| ***B42D 15/00*** | (2006.01) |

(56) References Cited

U.S. PATENT DOCUMENTS

| | | | | |
|---|---|---|---|---|
| 5,760,961 | A * | 6/1998 | Tompkin et al. | 359/576 |
| 8,199,913 | B2 | 6/2012 | Alasia et al. | |
| 2003/0211296 | A1 | 11/2003 | Jones | |

FOREIGN PATENT DOCUMENTS

| | | | |
|---|---|---|---|
| WO | 9955530 | | 11/1999 |
| WO | 9955530 | A1 | 11/1999 |
| WO | 2006007635 | A1 | 1/2006 |
| WO | 2013097028 | A1 | 7/2013 |

OTHER PUBLICATIONS

International Search Report issued for International Patent Application No. PCT/CA2011/050512, dated Aug. 21, 2012.

International Search Report for International Patent Application No. PCT/CA2014/050937 dated May 13, 2015.

Written Opinion for International Patent Application No. PCT/CA2014/050937 dated May 13, 2015.

* cited by examiner

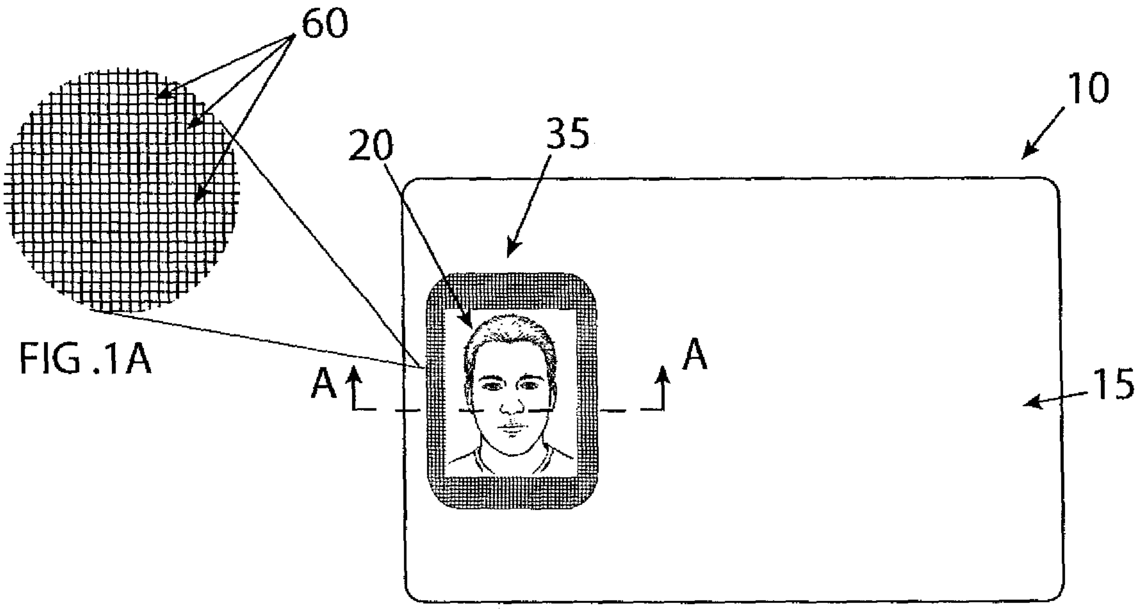
FIG .1A
FIG .1
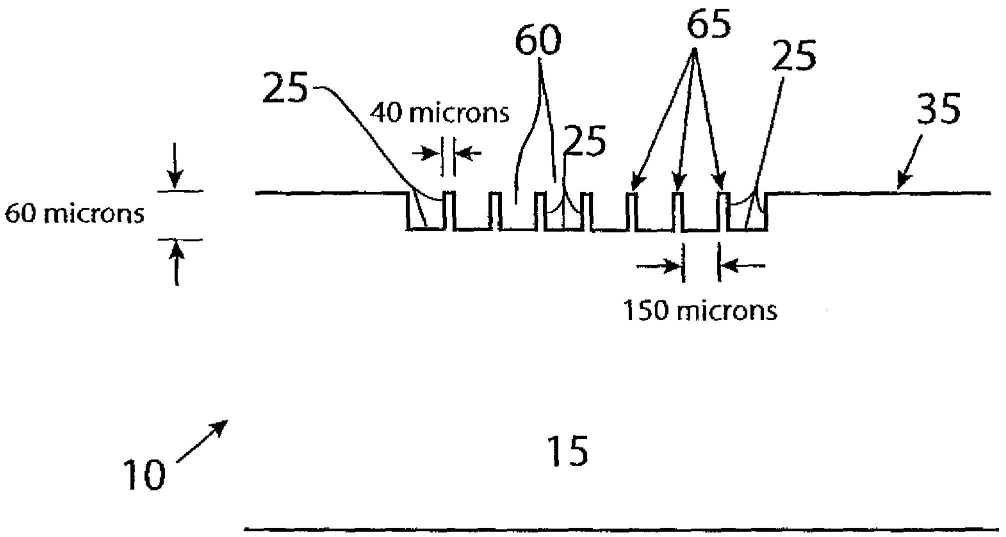
FIG .2

METHOD FOR PRINTING AN IMAGE ONTO A THERMOPLASTIC SUBSTRATE, PRE-FORMING PLATE USED THEREFOR AND SECURITY INSTRUMENT MADE THEREFROM

FIELD OF THE INVENTION

The invention relates generally to printing surface-applied images onto thermoplastic substrates used for security instruments such as identification cards and sheets, and, more particularly, to printing onto thermoplastic substrates surface-applied images having improved durability and security.

BACKGROUND

Security instruments such as identification cards and sheets normally include one or more printed images which are used to identify the cardholder and authenticate the security instrument. For example, a security instrument in the form of an identification card, a driver's license or personal identification sheet of a passport may be made of a thermoplastic substrate and bear a printed photograph of the person to whom the card, license or passport was issued to identify and verify a person holding the instrument. Typically, this photograph may be printed onto the thermoplastic substrate by means of ink jet printing using an ultraviolet (UV) curable ink. According to presently used ink jet printing methods, the UV cured ink jet image is applied to the surface of the thermoplastic substrate of the card which has a generally smooth or matte surface. After the personalization image has been printed onto the surface of the substrate a clear coating, or patch, may be printed over it to provide additional protection to the image. A protective patch typically comprises a UV cured varnish which is also applied by means of ink jet printing. Alternatively, hot lamination of a polyester patch is sometimes used. Disadvantageously, however, using a patch will increase the manufacturing cost for the security instrument and, depending upon the application, the patch may be prone to separate from the image.

To improve the adherence of the printed image to the surface of the thermoplastic substrate of a card an adhesion promoter may be used. It has been found, however, that the resulting images provide poorer characteristics of adhesion than desired.

One durability test method that is used for secure instruments comprising printed images, as an indicator of the wear resistance of the image is the Taber Abrasion Test. For example, using this test, a thermoplastic identification card comprising a personalization image printed by means of ink jet printing is typically expected to withstand 5,000 abrasion cycles during testing, without any degradation of the personalized areas on the card including those areas on which the personalization image appears.

In addition to improving both the adhesion and durability, it is desirable that personalization images (i.e. images used to authenticate a person's identity) applied to secure instruments be resistant to tampering by forgers, such as by replacing an authentic, personalized image with a non-authentic image. Increased security may be provided by incorporating predetermined features for detection and verification of the instrument for authenticity which are difficult to reproduce by a forger.

Therefore, it is desirable to provide one or more of the characteristics of improved adhesion, durability and security to secure instruments having surface applied printed images thereon.

SUMMARY OF THE INVENTION

The invention provides means for surface application of images, by printing, to preformed recessed image receiving surfaces of a thermoplastic substrate whereby the preformed recessed image receiving surfaces are below a nominal surface of the thermoplastic substrate and have dimensions designed according to the level of security and degree of durability desired for the particular application. For example, using preformed recesses of larger depth below the nominal surface of the substrate will generally provide greater durability and using preformed recesses of larger area below the nominal surface will accommodate a greater number and/or type of images in order to increase security. The preformed recessed image receiving surfaces may comprise of a pattern of cell structures of predetermined dimensions separated by a bridge pattern of predetermined dimensions which is preformed and recessed below a nominal surface of the substrate, wherein the predetermined dimensions of both the cell pattern and bridge pattern are chosen according to the level of security and degree of durability desired.

In accordance with the invention a method is provided for printing an image onto a predetermined area of a thermoplastic substrate. A thermoplastic substrate comprises in the predetermined area a pattern of recessed image receiving surfaces below a nominal surface of the thermoplastic substrate and a pattern of bridges separating the recessed image receiving surfaces, the depths of the recessed image receiving surfaces and the areas of the bridges separating the recessed image receiving surfaces, relative to the areas of the recessed image receiving surfaces, chosen to provide durability to the image after the image has been printed onto the predetermined area. The thermoplastic substrate so provided is printed with the image on the predetermined area, thereby forming a security instrument. The printing may be by ink jet printing. Preferably the pattern of recessed image receiving surfaces comprises a cell pattern of predetermined dimensions separated by a bridge pattern of predetermined dimensions, for example, the cells having a depth in the range of approximately 50-80 microns and a nominal breadth or diameter in the range of approximately 100-200 microns, and the bridges having a breadth in the range of approximately 40-60 microns.

Optionally, the recessed image receiving surfaces may comprise a pattern of latent image recesses recessed below the recessed image receiving surfaces, the pattern of latent image providing a visibly distinct latent image after the image has been printed onto the predetermined area and the printed image is viewed from directly above the image but is not visible when viewed from other angles. The thermoplastic substrate may also comprise a pattern of relatively shallow hidden image recesses below both the nominal surface of the thermoplastic substrate and the recessed image receiving surfaces. Also optionally, the cells of the cell pattern may comprise nominal cells having the same nominal shape and embedded-image-forming cells having a different shape from the nominal shape which together form a distinct embedded image within the nominal cells.

The thermoplastic substrate is preformed and may be provided by a lamination process using a preforming lamination plate whereby the preforming lamination plate comprises, in an area corresponding to the predetermined area of the thermoplastic substrate, a pattern of raised surfaces formed as a mirror image of the recessed image receiving surfaces of the thermoplastic substrate.

The thermoplastic substrate may be opaque and may include a thermoplastic transparent window. In a further embodiment the predetermined area comprising the pattern of recessed image receiving surfaces and pattern of bridges separating the recessed image receiving surfaces is provided on a back side of the transparent window and a mirror image of the image is printed onto the back side of the transparent window over the recessed image receiving surfaces.

Also in accordance with the invention a preforming plate, for example a lamination plate, is provided for preforming a predetermined area of a thermoplastic substrate comprising a pattern of recessed image receiving surfaces below a nominal surface of the thermoplastic substrate and a pattern of bridges separating the recessed image receiving surfaces. The preforming plate comprises a pattern of raised surfaces in an area corresponding to the predetermined area of the thermoplastic substrate wherein the pattern of raised surfaces is formed as a mirror image of the pattern of recessed image receiving surfaces and pattern of bridges. Where the recessed image receiving surfaces of the thermoplastic substrate comprise a pattern of latent image recesses recessed below the recessed image receiving surfaces, the pattern of raised surfaces of the preforming plate comprises raised surfaces formed as a mirror image of the pattern of latent image recesses.

Also in accordance with the invention there is provided a security instrument comprising a thermoplastic substrate and an image printed onto a predetermined area of the thermoplastic substrate (e.g. by ink jet printing), the predetermined area of the thermoplastic substrate comprising a pattern of recessed image receiving surfaces below a nominal surface of the thermoplastic substrate and a pattern of bridges separating the recessed image receiving surfaces. The depths of the recessed image receiving surfaces and the areas of the bridges separating the recessed image receiving surfaces, relative to the areas of the recessed image receiving surfaces, are predetermined to protect the image against wear of the security instrument.

Preferably, the pattern of recessed image receiving surfaces comprises a cell pattern of predetermined dimensions separated by a bridge pattern of predetermined dimensions. Optionally, the recessed image receiving surfaces may comprise a pattern of latent image recesses recessed below the recessed image receiving surfaces, the pattern of latent image providing a visibly distinct latent image when the printed image is viewed from directly above the image, the latent image being not visible when viewed from other angles. Also optionally, the cell pattern may comprise nominal cells having the same nominal shape and embedded-image-forming cells having a different shape from the nominal shape which together form a distinct embedded image within the nominal cells.

BRIEF DESCRIPTION OF THE DRAWINGS

The invention is described in detail below with reference to the following drawings drawn to facilitate illustration of features described herein and not to scale.

FIG. 1 illustrates a plan view of an exemplary security instrument comprising a thermoplastic substrate with preformed recessed image receiving surfaces on which a personalization image has been printed in accordance with the invention.

FIG. 1A illustrates a plan view of an enlarged portion of the surface area of the thermoplastic substrate of FIG. 1 prior to printing of the personalization image there over, to illustrate the preformed recessed image receiving surfaces of the invention which, in this example, are provided by a pattern of cell structures of predetermined dimensions separated by a bridge pattern of predetermined dimensions.

FIG. 2 illustrates a sectional view, at section A-A of the thermoplastic substrate of the exemplary security instrument of FIG. 1, prior to printing the image, showing preformed recessed image receiving surfaces in the area of the substrate to which the image is to be printed to make the security instrument illustrated in FIG. 1.

DETAILED DESCRIPTION

Figure 3:
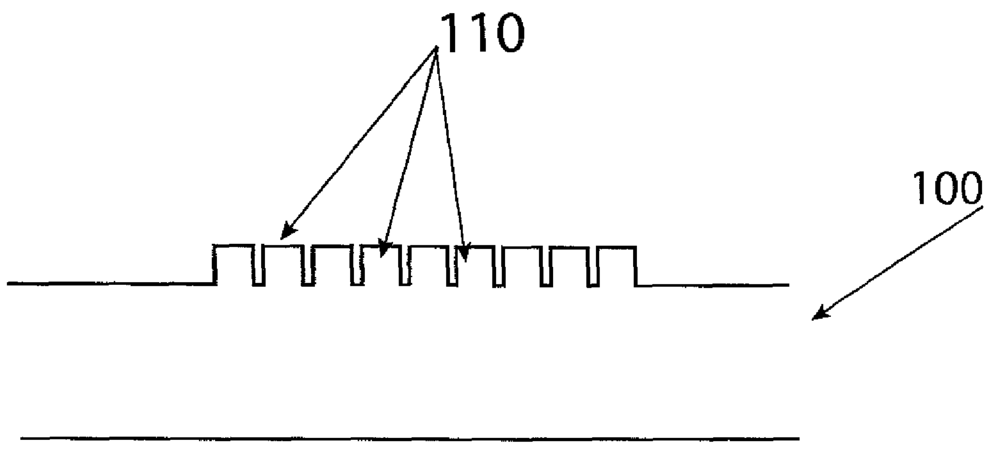
FIG. 3 illustrates a sectional view of a portion of a preforming lamination plate configured for making the thermoplastic substrate illustrated in FIG. 2, showing the portion of the plate configured to form the substrate section shown by FIG. 2.

The invention provides an improved method for making a security instrument having a thermoplastic substrate preformed with recessed image receiving surfaces and an image printed onto the surface of the preformed thermoplastic substrate. In preferred embodiments illustrated herein the image is printed by means of ink jet printing; however, it is to be understood that the invention is not limited to such method of printing. The invention also provides a preforming plate for making a preformed thermoplastic substrate having recessed image receiving surfaces. Further, the invention provides a security instrument made in accordance with the improved method. The term "security instrument" used herein means any document, card, sheet, booklet or other item for which authenticity is a characteristic that may become subject to risk or question and includes, without limitation, identification cards, licenses (e.g. driver's licenses), personal information sheets in passports and records of citizenship.

Referring to the examples of FIGS. 1, 1A and 2, an image 20 has been printed onto a thermoplastic substrate 15 of a security instrument 10 (e.g. an identification card) by means of ink jet printing. FIG. 1A shows a plan view of an enlarged portion of the print area of the thermoplastic substrate 15 prior to printing of the image 20. In this area of the substrate 15 recessed image receiving surfaces 25 are provided by preformed recesses below a nominal surface 35 of the substrate 15. As will be readily understood by persons skilled in the art, relative to the small scale of the recesses required for the recessed image receiving surfaces 25, being in the order of microns (e.g. 60 microns deep by 150 microns wide, in this illustrated example), the surface level of the thermoplastic substrate 15 may vary over the print area but it is not the surface level at any particular point in the area from which the recesses are formed or measured but instead a representative surface over the area. To account for this, the term "nominal surface" is used herein to mean a representative surface level over and immediately surrounding the print area in which the recessed image receiving surfaces 25 are provided.

In the illustrated embodiments the preformed recessed image receiving surfaces 25 of the thermoplastic substrate 15 are provided by a pattern of cells 60 of predetermined dimensions separated by a pattern of bridges 65 of predetermined dimensions. The particular cell pattern to be chosen for a particular application may be a honeycomb pattern, a square or diamond cell pattern, an irregular pattern or any other pattern suitable for the application. For an application in which an identification card is to follow the ISO 7810 standard a thermoplastic substrate of 0.030 inches (plus or minus 10%) is used to produce a card having a surface area of 53.98×85.6 square millimeters and a thickness of 0.762 millimeters (762 microns). The size of a print area for a photograph image may also be governed by a standard specification depending upon the application, for example the AAMVA, ICAO or other standard. For example, the AAMVA standard for driver's licenses (2005) specifies a minimum height of 25 microns and width of 22 microns and a maximum height of 40 microns and width of 35 microns. As an example, and depending upon the particular application, the recessed image receiving surfaces 25 may be provided as a pattern of cells having a 100-200 micron square diameter or nominal breadth, a depth of 30-70 microns and a pattern of bridges between the cells of 30-80 microns. For the particular examples of the illustrated embodiments the recessed cells 60 are square in shape and, apart from print areas comprising hidden images (as detailed more fully hereinafter), have a diameter of 150 microns and depth of 60 microns below the nominal surface 35 of the substrate 15, with bridges 65 of 40 microns separating the cells. The image 20 is printed onto the pre-formed thermoplastic substrate 15 by ink jet printing and an ultra-violet light (UV) curable ink was chosen for this.

For the illustrated embodiments, the thermoplastic substrate 15 is made by laminating together multiple layers of a thermoplastic material and the recessed image receiving surfaces 25 are made by means of a preforming lamination plate 100. As shown by FIG. 3, in the area of the thermoplastic substrate 15 which corresponds to the image 20, the lamination plate 100 is embossed with raised surfaces 110 configured to mirror the desired recessed image receiving surfaces 25 of the thermoplastic substrate 15 to be made using the lamination plate 100. As illustrated by FIGS. 2 and 3, the raised surfaces 110 (embossments) of the lamination plate 100 mirror the recessed image receiving surfaces 25 of the thermoplastic substrate 15 which was formed by laminating layers together using the lamination plate 100. During lamination layers of thermoplastic material are subjected to heat and pressure as per a conventional lamination process and pressed against the lamination plate 100 which causes the layers to bond together to form the thermoplastic substrate 15 and at the same time form the desired recessed image receiving surfaces 25 below a nominal surface 35 of the thermoplastic substrate 15.

The material of the thermoplastic substrate 15 used for the illustrated embodiments is polycarbonate which has been found to provide good protection against bending, impact and other stresses that an identity card or other type of security instrument is likely to encounter. However, it is to be understood by the skilled reader that although polycarbonate is selected for use in this example there are many other thermoplastic materials that may, alternatively, be used to provide characteristics of hardness and durability, including PVC (polyvinyl chloride), PET (Polyethylene terephthalate), PETG (copolymerized PET), acrylic and any other similar material that is suitable.

Other embodiments of the invention may be used to additionally provide security features to the printed security instrument 10, if desired, in the form of a latent image 80 and/or hidden image 60, as described in greater detail in the following with reference to FIG. 4.

Figure 4:
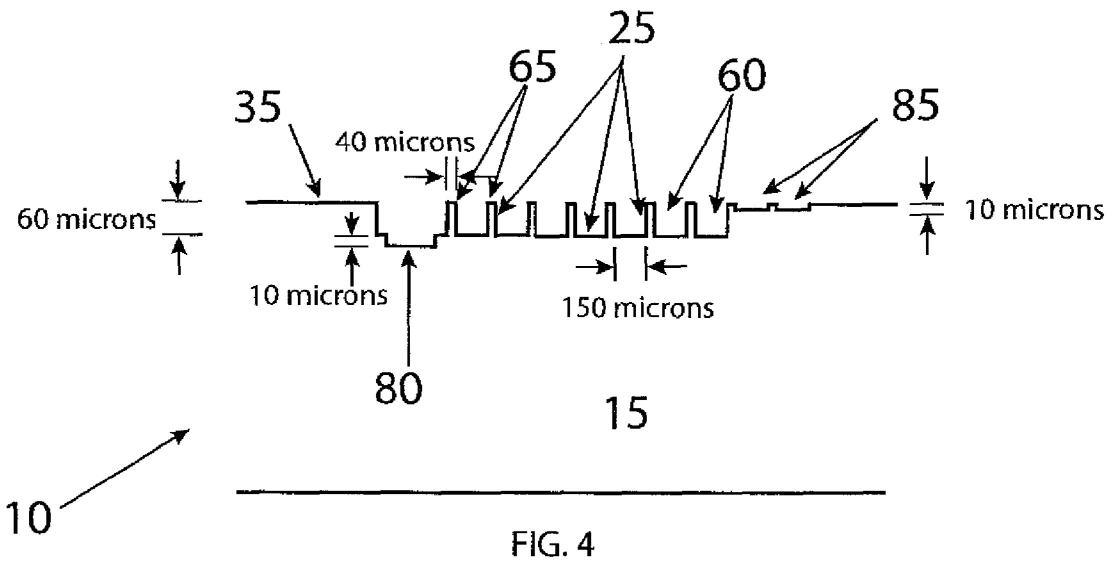
FIG. 4 illustrates a sectional view of a portion of a thermoplastic substrate prior to printing an image thereon, similar to FIG. 2 but for a different exemplary security instrument, showing preformed recessed image receiving surfaces according to the invention and comprising latent and hidden images formed therein in the area to be printed with the image.

To include a latent image within the printed image 20 of the security instrument 10 a latent image pattern of latent image recesses 80 is formed in the recessed image receiving surfaces 25 as shown by FIG. 4. The latent image pattern may, for example, form a text message such as "AUTHENTIC", a crest or emblem, or any other image that may be desired for a given application. For the embodiment of this particular illustration, the latent image recesses 80 have a depth of 10 microns below the recesses of the recessed image receiving surfaces 25 and breadth(s) determined according to the particular latent image to be formed, whereas the recessed image receiving surfaces 25 have a depth of 60 microns and nominal breadth of 150 microns. When the image 20 is ink jet printed onto the substrate 15 over the recessed image receiving surfaces 25 and latent image recesses 80 therein, more of the ink is collected in the deeper latent image recesses 80 and the latent image pattern appears as a visible image when viewed from angles directly or nearly above the printed substrate surface but is not visible when viewed from other angles. This latent visibility results from the multi-level planes created by the relief pattern in the recessed image receiving surfaces 25. The resulting latent image advantageously serves as a security feature for the printed security instrument 10.

A hidden image may also be included within the printed image 20 of the security instrument 10 to provide a feature that is not normally visible but will be revealed (i.e will become visible) if and when the instrument 10 is tampered with by forcibly abrading the surface of the card, such as when one attempts to scratch off a printed personalization image and replace it with an unauthentic image. To do so a pattern of relatively shallow recesses, referred to herein as hidden image recesses 85, is formed below both the nominal surface 35 of the substrate 15 and the recessed image receiving surfaces 15 in a predetermined area of the substrate 15 comprising the recessed image receiving surfaces 15. By relatively shallow depth it is meant that the depth of the hidden image recesses 85 is far enough below the nominal substrate surface 35 that normal wear of the surface will not wear away the surface 35 by the relatively shallow depth but close enough to the surface 35 that forced abrasion of the surface to scratch off the printed image would abrade the surface by the relatively shallow depth and thereby render visible the hidden image that is defined by the pattern of hidden image recesses 85. In the illustrated embodiment shown in FIG. 4 the depth of the hidden image recesses 85 is 10 microns whereas the depth of the recesses of the image receiving surfaces is 60 microns. The hidden image pattern may, for example, be a text message such as "CAUTION", a symbol or sign, or any other image that may be desired for a given application. The hidden image pattern is normally not discernible. However, if one were to tamper with the security instrument 10 by forcibly abrading the surface to remove a printed image above the pattern of hidden image recesses 85, the hidden image pattern would become visible as the abrading depth reaches the shallow depth of the hidden image recesses 85. The hidden image pattern so revealed is referred to herein as a hidden image and it advantageously serves as a security feature for the printed security instrument 10.

Figure 5A:
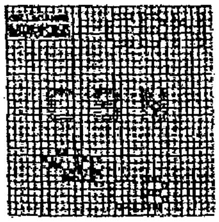
FIG. 5A illustrates a plan view of a portion of a surface area of another exemplary thermoplastic substrate, prior to printing an image thereon.
Figure 5B:
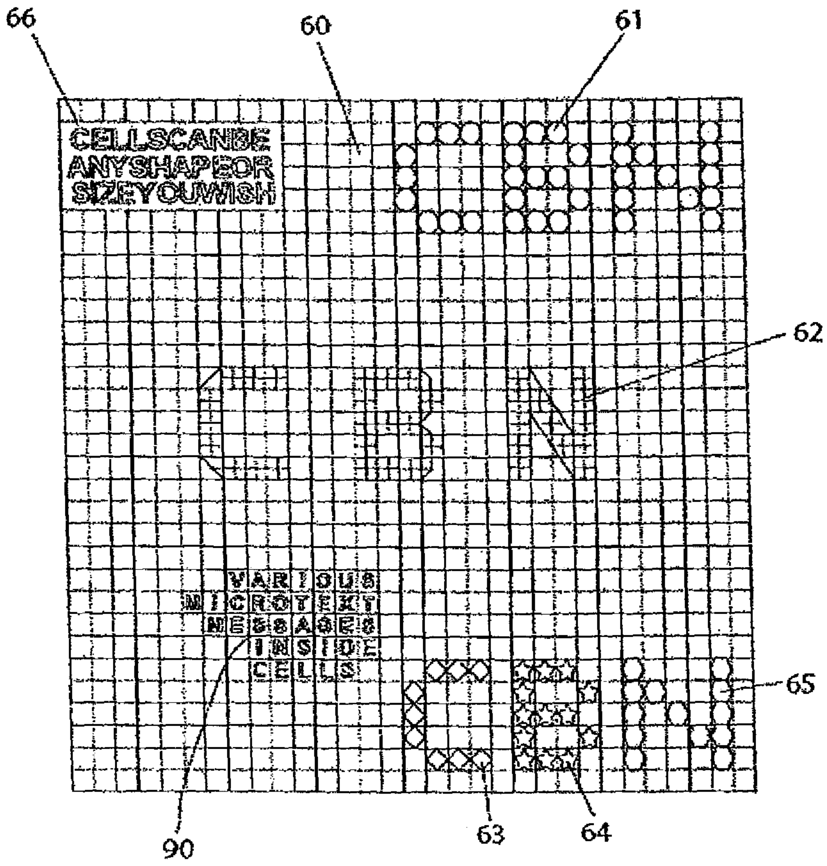
FIG. 5B is an enlarged view of FIG. 5A, showing preformed recessed image receiving surfaces in the form of exemplary alternative patterns of cell structures whereby the cell patterns form the illustrated exemplary embedded images "CBN", "VARIOUS MICROTEXT MESSAGES INSIDE CELLS" and "CELLS CAN BE ANY SHAPE OR SIZE YOU WISH".

FIG. 5A, and the enlarged version thereof shown by FIG. 5B, illustrate a further embodiment of the invention which incorporates embedded images, being the images "CBN", "CELLSCANBEANYSHAPEORSIZEYOUWISH" and "VARIOUS MICROTEXT MESSAGES INSIDE CELLS" in this illustration. The embedded images "CBN" are distinct "CBN" patterns formed by groups of cells 61, 63-64 of the same but different shape relative to the shape of nominal cells 60 in the areas surrounding those embedded image patterns, or by groups of cells 62 of the same but different size relative to the size of nominal cells 60 in the areas surrounding those embedded image patterns. The embedded image "CELLSCANBEANYSHAPEORSIZEYOUWISH" in this illustration is formed by cells 66 which are shaped to form the pattern of the embedded image. The embedded image "VARIOUS MICROTEXT MESSAGES INSIDE CELLS" in this illustration is formed by printed microtext whereby microtext is printed within individual cells 60 of a group of cells 60. The embedded images so formed may be discerned by viewing the security instrument 10 using magnification means but are not readily visible to the naked eye.

In a further embodiment of the invention (not illustrated) a transparent window may be provided in the thermoplastic substrate 15 and configured to protect the printed image 20. The embossed preforming lamination plate 100 is applied to the back side of the thermoplastic layers and window for lamination and, thus, after lamination of the layers, forms a pattern of recessed image receiving surfaces below a nominal surface of the back side of the window with a pattern of bridges separating the recessed image receiving surfaces. The mirror image of image 20 is printed onto the back side of the window over the recessed image receiving surfaces and when looking at the window from the front side of the window it appears as a clear image area with the image 20 visible. If it desired that the image be visible from the front side of the substrate only, the back side of the entire window area can be covered with an opaque coating to match the material of the thermoplastic substrate of the security instrument 10 (e.g. a white ink coating for a white polycarbonate substrate), and then further covered by a clear protective coating (e.g. a clear ink or varnish). Apart from the window area, the thermoplastic substrate 15 is printed on the front side and to a viewer viewing a security instrument 10 made therefrom it appears that the image 20 has also been printed on the front side. This provides to the printed image the greater durability of the invention and also greater security against tampering because a person attempting to remove the image is likely to do so from the front surface of the window whereas the printed image is protected by being located well below that surface.

For the illustrated embodiments the substrate 15 was preformed with the recessed image receiving surfaces 25 and, in the case of the embodiment of FIG. 4 with the latent image recesses 80 and hidden image recesses 85, during lamination by means of matching lamination plates (i.e. lamination plates having mirror image surfaces). Alternatively, however, the recessed image receiving surfaces 25 and latent image and/or hidden image recesses 80, 85 could be preformed in a substrate 15 by means of a preforming plate applied to the substrate using a process other than lamination or, by laser ablation or by mechanical means. By these methods, the desired pattern of recessed image receiving surfaces is drilled or ablated into the substrate 15 and in those areas where a pattern of latent or hidden image recesses is desired the drilling/ablating is deeper or shallower, respectively in those areas.

The details of the illustrated embodiment may be varied as considered expedient to a person skilled in the art and are not to be considered essential to the invention by reason only of inclusion in the embodiments illustrated herein. Rather, the invention is defined by the appended claims.

What is claimed is:

1. A method for printing an image onto a predetermined area of a thermoplastic substrate, the method comprising:

(a) providing a thermoplastic substrate comprising in the predetermined area a pattern of recessed image receiving surfaces below a nominal surface of the thermoplastic substrate and a pattern of bridges separating the recessed image receiving surfaces, the depths of the recessed image receiving surfaces and the areas of the bridges separating the recessed image receiving surfaces, relative to the areas of the recessed image receiving surfaces, chosen to provide durability to the image after the image has been printed onto the predetermined area, wherein the pattern of recessed image receiving surfaces comprises a cell pattern of predetermined dimensions separated by a bridge pattern of predetermined dimensions, the predetermined dimensions of cells of the cell pattern comprising a depth in the range of approximately 50-80 microns and a nominal breadth or diameter in the range of approximately 100-200 microns, and the predetermined dimensions of bridges of the bridge pattern comprise a breadth in the range of approximately 40-60 microns; and, (b) printing the image, by ink jet printing, onto the predetermined area of the thermoplastic substrate.

2. The method of claim 1 whereby the recessed image receiving surfaces comprise a pattern of latent image recesses recessed below the recessed image receiving surfaces, the pattern of latent image providing a visibly distinct latent image after the image has been ink jet printed onto the predetermined area and the printed image is viewed from directly above the image but is not visible when viewed from other angles.

3. The method of claim 1 whereby the thermoplastic substrate comprises a pattern of relatively shallow hidden image recesses below both the nominal surface of the thermoplastic substrate and the recessed image receiving surfaces.

4. The method of claim 1 whereby the cells of the cell pattern comprise nominal cells having the same nominal shape and embedded-image-forming cells having a different shape from the nominal shape which together form a distinct embedded image within the nominal cells.

5. The method of claim 1 whereby providing the thermoplastic substrate includes preforming the thermoplastic substrate by a lamination process using a preforming lamination plate whereby the preforming lamination plate comprises, in an area corresponding to the predetermined area of the thermoplastic substrate, a pattern of raised surfaces formed as a mirror image of the recessed image receiving surfaces of the thermoplastic substrate.

6. The method of claim 1 whereby the thermoplastic substrate is opaque, a thermoplastic transparent window is provided in the opaque thermoplastic substrate, the predetermined area comprising the pattern of recessed image receiving surfaces and pattern of bridges separating the recessed image receiving surfaces is provided on a back side of the transparent window, and a mirror image of the image is printed onto the back side of the transparent window over the recessed image receiving surfaces.

7. The method of claim 1 whereby a security document is formed.

* * * * *